United States Patent [19]

Daly

[11] Patent Number: 4,605,354

[45] Date of Patent: Aug. 12, 1986

[54] SLIP SENSITIVE ROBOT GRIPPER SYSTEM

[75] Inventor: Timothy P. Daly, Fishkill, N.Y.

[73] Assignee: International Business Machines Corporation, Armonk, N.Y.

[21] Appl. No.: 635,988

[22] Filed: Jul. 30, 1984

[51] Int. Cl.<sup>4</sup> ............................................. B66C 1/00
[52] U.S. Cl. .................................. 414/730; 901/33; 294/907
[58] Field of Search ............... 901/31, 32, 33, 34, 901/35, 36, 39; 414/730; 294/907, 402, 86 R, 106

[56] References Cited

U.S. PATENT DOCUMENTS

| 3,904,234 | 9/1975 | Hill et al. | 901/32 X |
| 4,306,148 | 12/1981 | Ringwall et al. | 250/229 |

FOREIGN PATENT DOCUMENTS

| 0112729 | 4/1984 | European Pat. Off. | |
| 2542659 | 9/1984 | France | |
| 209409 | 9/1984 | German Democratic Rep. | |
| 52-33253 | 3/1977 | Japan | 901/33 |
| 52-33254 | 3/1977 | Japan | 901/33 |
| 53-13767 | 2/1978 | Japan | 901/34 |
| 433023 | 11/1974 | U.S.S.R. | 901/34 |

OTHER PUBLICATIONS

T. G. Kennedy, "Force-to-Deviation Conversion Table for Robotic Gripping", IBM Technical Disclosure Bulletin, vol. 25, No. 6, Nov. 1982.

Primary Examiner—Leslie J. Paperner
Assistant Examiner—Dennis Williamson
Attorney, Agent, or Firm—Carl C. Kling

[57] ABSTRACT

A resilient gripper pad stores deformation energy just before the gripped object starts to slip, then rapidly accelerates as it suddenly releases the energy in the springback to rest position. An accelerometer in the resilient pad (corrected for ambient acceleration by differentiation with a nearby second accelerometer) provides information by which the control computer of a closed loop robot system mandates the manipulation of objects by controlled slipping. Controlled transitions of gripping (releasing) action evoked by the control computer provide related sequences of grip (slide) events, with one or more slip (pad chatter) events intervening at the threshold. Prior to the slide, there is an instant when the gripped object starts to slip on a slip pad on one digit of the gripper, but remains frictionally gripped by a resilient pad on the opposing digit. During this instant, the resilient pad deforms downward because of gravity on the gripped object. Next, when gripping force relaxes just a little more, the object slides free and the resilient pad springs back to its rest position. Two accelerometers, one mounted in the resilient pad to experience springback acceleration, and the other mounted in a complementary slip pad to experience ambient acceleration, are differentially compared. A computer manipulates signals related to motion experience of the gripper (grip or release) and detection (or absence) of springback acceleration, determines gripping, slipping or sliding status, and mandates the appropriate gripper action.

6 Claims, 2 Drawing Figures

SLIP SENSITIVE ROBOT GRIPPER SYSTEM

BACKGROUND OF THE INVENTION

1. Field of the Invention

This invention relates to slip sensing robot gripper systems, and relates more particularly to a robot gripper system, operating on the springback phenomenon, the high speed return to rest configuration (springback acceleration) of a resilient pad which is suddenly released after being deformed linearly when a lightly gripped object suddenly releases energy stored by linear deformation of the gripper pad, which can determine slipping of an object lightly to facilitate controlled gripping, controlled slipping and controlled sliding of objects.

2. Description of the Prior Art

There are a great number of robot gripper systems which have been deployed or at least described in publications, some with relatively sophisticated feedback and servo systems to facilitate grasping of objects without damage. Remote pickup devices normally depend upon a human operator for intelligent control via various sensing and servo devices. Operating alone, however, the robot normally does not have sufficient sensing or intelligence to make the necessary determinations for controlled slipping of objects.

Robots may be equipped with a variety of sensing mechanisms, including optical viewing, weight measuring devices, strain gages and length measuring devices, among others. A particular problem with these prior art devices, however, is that they are not sensitive to the complicated dynamics of initial slippage of a gripped object during the processes of pickup and release. The human hand-brain combination handles initial slippage easily and elegantly. A person may control the slippage of a pencil in hand, letting the pencil slip in a controlled slide so as to come to rest in the writing position.

Controlled slippage in robot grippers has not normally been deployed; there is no known body of slip sensing art in robotics upon which to build. Certain vehicle safety programs have included skid sensing devices, again without common deployment; skid sensing devices tend to be optimized for rotating wheels and cannot be used directly in robotic grippers.

The following are representative of the prior art:

U.S. Pat. No. 3,744,850, Bartholome, AUTOMATIC TRACTION CONTROL SYSTEM, July 10, 1973, shows a wheel slippage detector comprising an angular accelerometer and a linear accelerometer which press against one another to measure the ratio of wheel angular acceleration to vehicular linear acceleration. Closure of the loop is obtained by interrupting the vehicle ignition circuit to slow the vehicle upon detection of a skid, and to control flow of brake fluid, so as to control slippage for maximum braking efficiency.

U.S. Pat. No. 4,306,148, Ringwall et al., TACTILE SENSOR, Dec. 15, 1981, shows a tactile feel system for a robot, in which a number of pneumatic passages are each equipped with a resilient light reflective tab and an optical fiber, and deformations of the tabs, indicating the presence and shape of the object, may be sensed.

U.S. Pat. No. 3,904,234, Hill et al., MANIPULATOR WITH ELECTROMECHANICAL TRANSDUCER MEANS, Sept. 9, 1975, shows an array of electromechanical transducers for force and slip sensing. Slip sensors include " . . . rotatable disks . . . extending outwardly from the opposing jawfaces." Hill does not show any slip sensor operating on the springback phenomenon.

Japanese Patent No. 52-33253, Hoshino, shows a hydraulic technique for increasing pressure and moving the gripper upwards until no slip is sensed. Hoshino does not show any slip sensor operating on the springback phenomenon.

Japanese Patent No. 52-33254, Hoshino, shows a similar hydraulic technique for increasing pressure until no slip is sensed. Hoshino does not show any slip sensor operating on the springback phenomenon.

Japanese Patent No. 53-13767, Aoki, shows a pneumatic gripper which applies force controlled in response to position with respect to an array of photodetectors and light emitting elements. Aoki does not show any slip sensor operating on the springback phenomenon.

USSR author's certificate No. 433,023, Liberman et al., ROBOT MANIPULATOR, Urals Polytechnic Institute—Kirov, Nov. 18, 1974, shows a robot manipulator with an electromechanical position transducer for slip sensing. A mechanical belt in one gripper face rotates the stem of a potentiometer for slip sensing. This USSR author's certificate does not show any slip sensor operating on the springback phenomenon.

SPRINGBACK PHENOMENON

The springback phenomenon upon which this slip sensor is based is the high speed return to rest configuration (springback acceleration) of a resilient pad which is suddenly released after being deformed linearly.

This slip sensor operates in response to the dynamic phenomenon of initial slippage of a relatively incompressible object under a linear force (e.g., gravity) as a gripper with a resilient face pad relaxes its hold.

As the gripper starts to relax its grip, just prior to initial slippage of the object, the resilient face pad deforms laterally and significantly; the object is solidly held.

Just before initial slippage, the object moves infinitesimally in the direction of linear force, leaving a slight linear deformation of the resilient face pad as the gripper relaxes and releases the resilient face pad from lateral deformation. This loads the resilient pad with a finite stored linear energy as a function of the linear deformation; the object serves as a cocked trigger for the stored linear energy in the form of deformation of the resilient face pad.

At the instant of initial slippage, the object breaks free of the resilient face pad, releasing the stored linear energy. The resilient face pad, loaded with stored energy is released by the slipping object, and springs back to its rest configuration. This springback is unrestrained and therefore quick.

The prior art does not suggest the use of the springback acceleration of a resilient pad to detect initial slippage of a gripped object.

SUMMARY OF THE INVENTION

The invention is a slip determining robot gripper system which operates by differentially detecting the springback acceleration of a first accelerometer, designated springback accelerometer, embedded in a resilient pad versus the ambient acceleration of a second accelerometer, a non-springback accelerometer, for comparison embedded in a non-resilient portion adjacent the resilient pad.

The object of the invention is to control the slipping of an object in a robot gripper so as to make controlled slipping a useful robot gripper function.

It is a further object of the invention to determine the grip/slip/slide thresholds of an object held by a robot, and to make appropriate adjustments to control slipping without dropping the object held.

A complementary object of the invention is to determine the occurrence of slipping speedily enough to permit closed loop control of the object pickup, with sufficient force to lift the object, but without such great force that the object is endangered.

A feature of the invention is that it permits controlled gripping of an object by a robot, by sensing the springback motion of a springback accelerometer embedded in a resilient gripper pad, corrected for ambient motion by differential comparison with the simultaneous non-springback motion of an ambient accelerometer located adjacent but not subject to frictional linear deformation, the accelerometer difference measuring the springback acceleration of the resilient gripper pad after the pad has been deformed linearly by object friction, at the threshold of slipping at which time the pad rapidly accelerates to high velocity as it springs back to its rest position.

An advantage of the invention is the elegant simplicity with which it carries out the slip determining function and permits closed loop servo operation of a robot gripper.

The foregoing and other objects, features and advantages of the invention will be apparent from the more particular description of the preferred embodiments of the invention, as illustrated in the accompanying drawing.

DESCRIPTION OF A PREFERRED EMBODIMENT OF THE INVENTION

Figure 1:
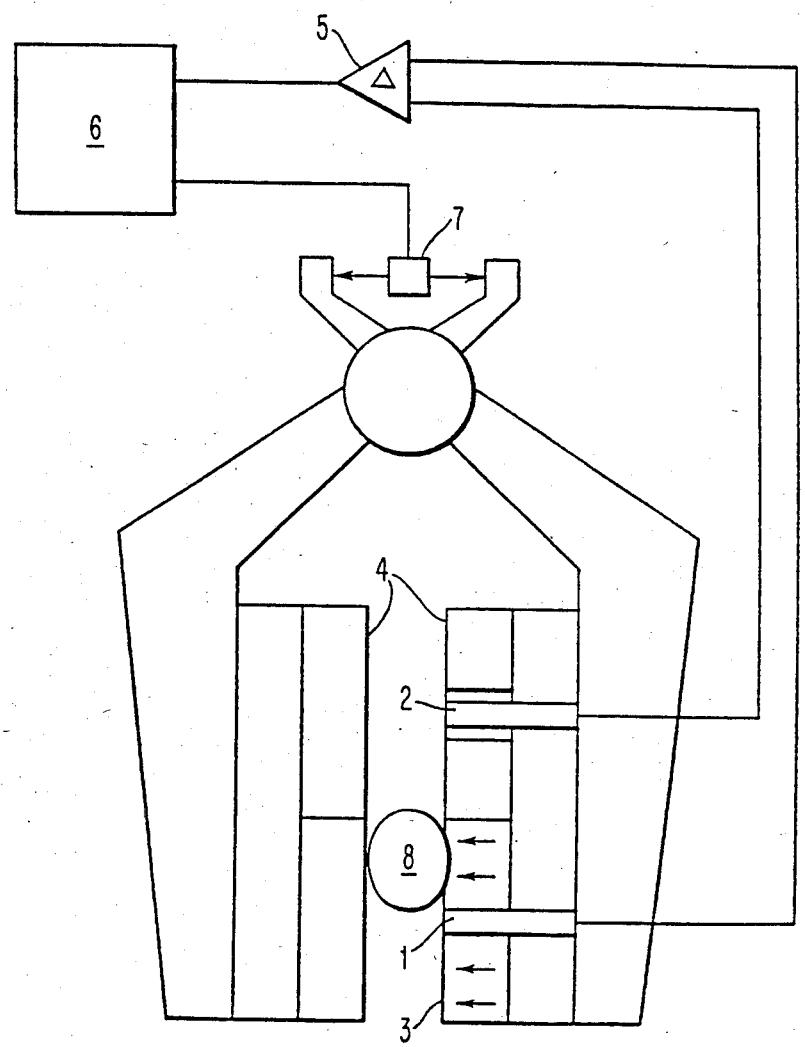
FIG. 1 is a semidiagrammatic depiction of the preferred embodiment of the invention, showing springback accelerometer and ambient accelerometer embedded respectively in resilient and non-resilient pad areas on one digit of the gripper, opposite a smooth low friction opposed digit.

FIG. 1 shows semidiagrammatically a slip-sensing gripper system embodying the invention. The term "ambient accelerations" includes the accelerations of the gripper including the object gripped. Accelerometers 1 and 2 are mounted with a common ambience; that is, they are mounted in a common digit or in complementary digits of the gripper so as to experience the same ambient accelerations as a result of motions provided to the gripper by motions of the gripper support mechanism. For ease of discussion the accelerometers will be designated "springback" accelerometer 1 and "ambient" accelerometer 2, the designations merely identifying the function to which the accelerometer is applied, and not implying any particular type of accelerometer. The term "springback acceleration" describes the linear acceleration of the resilient pad as it returns to its relaxed relaxed configuration after being deformed by slight motion of a gripped object with respect to the gripper, which slight motion is due to gravity or other linear force applied to the lightly gripped object in a manner to cause object slippage with respect to the gripper. A suitable accelerometer type is a flexible piezoelectric accelerometer such as is marketed by Vernitron under the trademark "Bi-Morph." If necessary, accelerometers 1 and 2 may be mechanically or electronically matched. Other types of accelerometer will function properly, so long as the accelerometer is physically amenable to being mounted in the gripper pad and responds to the accelerations involved.

Accelerometers 1 and 2 are mounted operationally in one digit of the gripper, which has a resilient gripper pad 3 in which the springback accelerometer 1 is embedded. The gripper also has on the same digit and on the opposing digit one or more additional pads, slip pads 4, which have gripping surfaces which are hard and smooth. Ambient accelerometer 2 is affixed inside slip pad 4, preferably on the same digit on the gripper, so as to experience common ambient accelerations with accelerometer 1, but to experience none of the springback acceleration occurring at the flexed resilient pad 3 when slippage events occur. A differential comparison of the outputs of accelerometers 1 and 2 thus includes cancelation of identical ambient acceleration signals and results in a signal indicative of the springback event, the occurrence of sudden release and consequent return from a linearly flexed configuration to rest configuration.

The gripper is controlled by computer 6, which responds to feedback signals from accelerometers 1 and 2, via differential amplifier 5, by sending control signals to gripper motor 7. As shown in FIG. 1, the gripper is holding object 8 stationary, without slippage and without crushing it. The small arrows in the gripper pad merely indicate resilient gripping force; computer control of motor 7 and the resistance of object 8 prevent the conversion of such force to motion.

Figure 2:
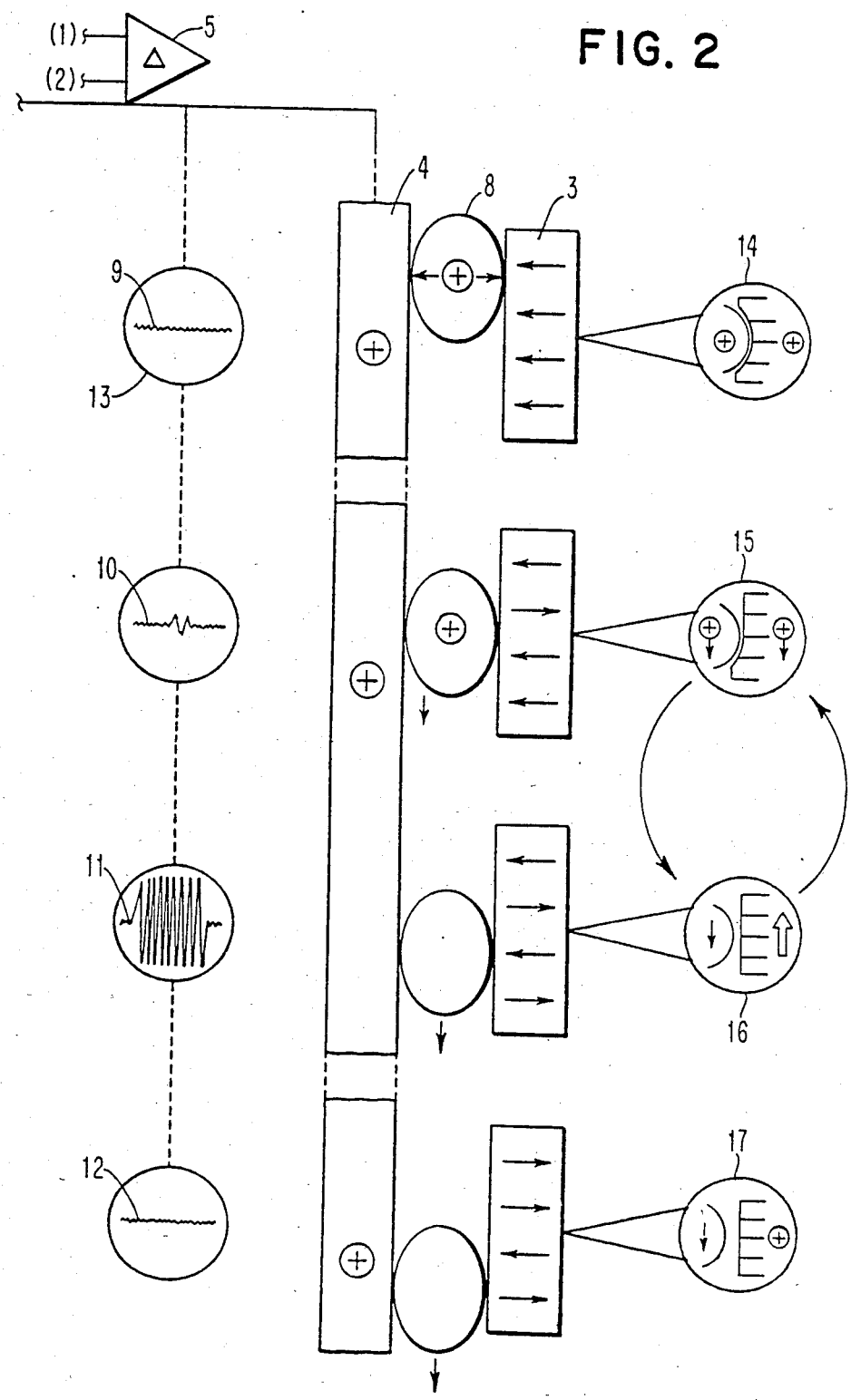
FIG. 2 is a composite semischematic depiction of the sequence of events surrounding the slip thresholds of gripping an object.

FIG. 2 illustrates diagrammatically the various events occurring during gripping, slipping and release of the object. Object 8 is shown held by gripper pads 3 and 4, while accelerometers 1 and 2 provide their inputs for comparison by differential amplifier 5. The output of differential amplifier 5 is shown in a series of views 9-10-11-12 (as might be seen on the tube 13 of an oscilloscope) illustrating the activity of object 8 with respect to resilient pad 3 as shown diagrammatically in inset views 14-15-16-17.

Object 8 is shown in a multiple view, top to bottom, as follows:

inset view 14=as object 8 is firmly gripped by the gripper, providing a baseline differential acceleration signal as shown by trace 9;

inset view 15=as object 8 begins to slip on hard smooth pad 4 while frictionally held by resilient pad 3, which is deforming slightly downward under frictional pull by object 8 as influenced by gravity, providing only a small (under-threshold) differential acceleration signal as shown by trace 10, but storing energy for subsequent release in the form of springback;

inset view 16=as object 8 breaks loose from pad 3 and pad 3 springs back to its rest position, providing a strong (over-threshold) springback acceleration signal, as shown by trace 11, as a result of the sudden release of stored energy as the resilient pad returns to rest position;

inset view 17=as object 8 continues free slippage downward under gravity, providing a baseline differential acceleration signal as shown by trace 12.

The + signs in FIG. 2 are used to illustrate fixation in space, relative to the gripper, as contrasted to motion relative to the gripper. The arrows in resilient pad 3 are meant to show relative strength of grip, which diminishes in successive views from top to bottom in FIG. 2 as the grip relaxes.

Slipping may be characterized by pad chatter, as the frictional gripping and springback sliding events depicted in inset views 15 and 16 are iterated. Pad chatter may be imperceptible to the observer but within the sensing capability of the slip sensitive robot gripper system.

Gripping and sliding operations provide similar sequences of signals, with intervening pad chatter as one springback acceleration or an iteration of springback accelerations occurs during a sequence of slipping events. The threshold gripping event is determined as the first event interval after pad chatter during a gripping action, as contrasted to the threshold sliding event determined as the first event interval after pad chatter during an ungripping action.

Determinations are based upon pad chatter, followed by an interval during which there is no continuing pad chatter. If the gripper system is to provide chatter-free object pickup, a low-threshold detection technique capable of detecting the small differential acceleration of threshold deformation of pad 3 (see trace 10) would be required, a situation requiring great care in handling the gripper or possible rough handling of the object. An ungripping action normally includes pad chatter and thus this invention may be used for either controlled slipping or for determining the threshold of sliding.

The computer 6 serves as control means, with its program being operative to control all gross function selection and positioning, to control whether the gripping action is toward gripping or toward releasing, the action control providing for action in the form of motion or force as appropriate. The computer is programmed further to respond to signals from the slip sensing means 1,2,3,4,5 to detect and respond to a multiplicity of states including gripping, slipping and sliding as well as slip status thresholds between states.

Computer 6 programming includes selective fine control of gripping action to gripping motor 7 upon detection of a slip status change boundary. Internal comparisons between status identifier and previous status identifications make it a reasonable application of choice of function and ordinary programming skill to carry out the desired controlled slipping along with the other functions built into the robot.

Thus, while the invention has been described with reference to preferred embodiments thereof, it will be understood by those skilled in the art that various changes in form and details may be made without departing from the scope of the invention.

What is claimed is:

1. A gripping robot having a gripper characterized by
   (a) slip sensing means (1,2,3,4,5) at least partially mounted in the gripper and providing an output related to rapid acceleration of a linearly deformed resilient pad as it springs back to rest position;
   (b) slip determining control means (6), responsive to said slip sensing means and other inputs, to provide control of gripping action as a function of inputs including output from said slip sensing means, to provide a gripper control output; and
   (c) servo means (7) responsive to said control means 6 to provide controlled gripping action to the gripper;

whereby an object held by the gripper may be imparted controlled slipping motion.

2. A gripping robot according to claim 1, in which the gripper has a plurality of digits further characterized in that
   said slip sensing means comprises at least one slip pad (4) and at least one resilient pad (3) having a gripping surface, which resilient pad (3) deforms parallel to its gripping surface during threshold slippage, when the weight of the gripped object (8) exceeds the frictional force of said slip pad (4) but does not exceed the frictional force of said resilient pad (3), permitting slippage of the object (8) with respect to said slip pad (4) and storing energy in the form of surface-parallel deformation of said resilient pad (3), storing energy in said resilient pad (3), which resilient pad (3) subsequently springs back at relatively high springback acceleration as its stored energy is suddenly released by threshold slippage of the gripped object (8);
   said sensing means also comprises a first accelerometer (1) mounted internal to said resilient pad (3) so as to respond to springback acceleration;
   said slip sensing means also comprises a second accelerometer (2) mounted on the same gripper as said first accelerometer (1) but external to said resilient pad (3) so as to be unaffected by springback acceleration; and said slip sensing means also comprises differential means (5) for determining relative acceleration between said first accelerometer (1) and said second accelerometer (2).

3. A gripping robot according to claim 2, in which the gripper has a plurality of digits further characterized in that
   said slip sensing means comprises at least one slip pad (4) at least partially opposing said resilient pad 1 and said second accelerometer (2) is mounted in said slip pad (4).

4. A gripping robot according to claim 3, further characterized in that
   said control means (6) is operative to control whether the gripping action is toward gripping or toward releasing, and further to respond to signals from said slip sensing means to detect and respond to a multiplicity of states including gripping, slipping and sliding as well as status boundaries between states.

5. A gripping robot according to claim 4, further characterized in that
   said control means (6) includes selective fine control of gripping action upon detection of a slip status change boundary.

6. A slip sensor for a robot gripper having at least one resilient pad, which pad is subject to linear acceleration forces upon sudden release of stored linear energy as it springs back to rest position when a gripped object starts to slip, in addition to ambient acceleration forces occurring as the gripper moves about characterized by
   accelerometer means physically mounted within the resilient pad so as to experience rapid acceleration upon springback of said resilient pad toward the rest position, and thus to provide a composite signal of springback acceleration plus ambient acceleration;
   means to correct said composite signal by cancelling the effect of ambient acceleration to provide a corrected signal; and
   means to detect slippage as a function of said corrected signal.

* * * * *